US009178946B2

(12) United States Patent
Weel

(10) Patent No.: US 9,178,946 B2
(45) Date of Patent: Nov. 3, 2015

(54) DEVICE DISCOVERY FOR DIGITAL ENTERTAINMENT NETWORK

(75) Inventor: Martin Weel, Modjeska, CA (US)

(73) Assignee: Black Hills Media, LLC, Wilmington, DE (US)

( * ) Notice: Subject to any disclaimer, the term of this patent is extended or adjusted under 35 U.S.C. 154(b) by 1395 days.

(21) Appl. No.: 12/019,015

(22) Filed: Jan. 24, 2008

(65) Prior Publication Data
US 2008/0133759 A1 Jun. 5, 2008

Related U.S. Application Data

(62) Division of application No. 10/840,108, filed on May 5, 2004.

(51) Int. Cl.
G06F 15/16 (2006.01)
H04L 29/08 (2006.01)
H04N 21/41 (2011.01)
H04L 29/06 (2006.01)
H04L 12/28 (2006.01)
H04W 8/00 (2009.01)
H04W 40/24 (2009.01)
H04W 48/16 (2009.01)
H04W 84/12 (2009.01)

(52) U.S. Cl.
CPC ............ H04L 67/16 (2013.01); H04L 65/4084 (2013.01); H04N 21/4126 (2013.01); H04L 12/2809 (2013.01); H04L 2012/2849 (2013.01); H04W 8/005 (2013.01); H04W 40/246 (2013.01); H04W 48/16 (2013.01); H04W 84/12 (2013.01)

(58) Field of Classification Search
USPC ......... 709/227, 201, 202, 203, 217, 218, 219, 709/220, 221, 223, 224, 225, 226, 228, 709/229; 455/426, 1, 432, 435.1, 66.1; 340/901; 701/45, 51, 213
See application file for complete search history.

(56) References Cited

U.S. PATENT DOCUMENTS

| 5,168,481 A | 12/1992 | Culbertson et al. |
| 5,262,875 A | 11/1993 | Mincer et al. |
| 5,440,334 A | 8/1995 | Walters et al. |
| 5,493,692 A | 2/1996 | Theimer et al. |
| 5,616,876 A | 4/1997 | Cluts |
| 5,710,970 A | 1/1998 | Walters et al. |
| 5,754,939 A | 5/1998 | Herz et al. |
| 5,790,426 A | 8/1998 | Robinson |

(Continued)

FOREIGN PATENT DOCUMENTS

| EP | 0984584 A1 | 3/2000 |
| GB | 2399928 A | 9/2004 |

(Continued)

OTHER PUBLICATIONS

"Internet Relay Chat—Wikipedia, the free encyclopedia," http://en.wikipedia.org/wiki/IRC, printed Nov. 16, 2007, 11 pages.

(Continued)

Primary Examiner — Saket K Daftuar

(57) ABSTRACT

A method for playing music, the method includes providing a plurality of devices on a wireless local area network, bringing a new device into a range of the wireless local area network, and receiving a list of devices that are on the local area network at the new device from a server not on the local area network.

20 Claims, 8 Drawing Sheets

(56) References Cited

U.S. PATENT DOCUMENTS

| | | | |
|---|---|---|---|
| 5,796,727 A * | 8/1998 | Harrison et al. | 370/338 |
| 5,884,282 A | 3/1999 | Robinson | |
| 5,903,901 A | 5/1999 | Kawakura et al. | |
| 5,949,776 A * | 9/1999 | Mahany et al. | 370/338 |
| 6,014,090 A | 1/2000 | Rosen et al. | |
| 6,041,311 A | 3/2000 | Chislenko et al. | |
| 6,049,711 A | 4/2000 | Ben-Yehezkel et al. | |
| 6,064,379 A | 5/2000 | DeMoney | |
| 6,088,722 A | 7/2000 | Herz et al. | |
| 6,192,340 B1 | 2/2001 | Abecassis | |
| 6,195,657 B1 | 2/2001 | Rucker et al. | |
| 6,240,069 B1 | 5/2001 | Alperovich et al. | |
| 6,248,946 B1 | 6/2001 | Dwek | |
| 6,317,722 B1 | 11/2001 | Jacobi et al. | |
| 6,349,203 B1 | 2/2002 | Asaoka et al. | |
| 6,385,596 B1 * | 5/2002 | Wiser et al. | 705/51 |
| 6,456,234 B1 * | 9/2002 | Johnson | 342/357.09 |
| 6,526,411 B1 | 2/2003 | Ward | |
| 6,529,136 B2 | 3/2003 | Cao et al. | |
| 6,539,232 B2 | 3/2003 | Hendrey et al. | |
| 6,542,750 B2 | 4/2003 | Hendrey et al. | |
| 6,587,127 B1 | 7/2003 | Leeke et al. | |
| 6,618,593 B1 | 9/2003 | Drutman et al. | |
| 6,657,116 B1 | 12/2003 | Gunnerson | |
| 6,675,015 B1 * | 1/2004 | Martini et al. | 455/436 |
| 6,675,268 B1 | 1/2004 | DeKoning et al. | |
| 6,853,841 B1 | 2/2005 | St. Pierre | |
| 6,865,600 B1 | 3/2005 | Brydon et al. | |
| 6,868,403 B1 * | 3/2005 | Wiser et al. | 705/51 |
| 6,876,642 B1 * | 4/2005 | Adams et al. | 370/338 |
| 6,882,299 B1 | 4/2005 | Allport | |
| 6,885,362 B2 * | 4/2005 | Suomela | 345/156 |
| 6,933,433 B1 | 8/2005 | Porteus et al. | |
| 6,937,860 B2 * | 8/2005 | Jahn | 455/436 |
| 6,946,988 B2 | 9/2005 | Edwards et al. | |
| 6,947,571 B1 * | 9/2005 | Rhoads et al. | 382/100 |
| 6,954,443 B2 * | 10/2005 | Forstadius et al. | 370/331 |
| 6,970,703 B2 * | 11/2005 | Fuchs et al. | 455/426.1 |
| 6,975,266 B2 * | 12/2005 | Abraham et al. | 342/357.59 |
| 6,982,780 B2 | 1/2006 | Morley et al. | |
| 6,990,497 B2 | 1/2006 | O'Rourke et al. | |
| 6,993,532 B1 | 1/2006 | Platt et al. | |
| 7,000,188 B1 | 2/2006 | Eustace | |
| 7,020,710 B2 | 3/2006 | Weber et al. | |
| 7,028,082 B1 | 4/2006 | Rosenberg et al. | |
| 7,035,618 B2 | 4/2006 | Schnurr | |
| 7,035,912 B2 | 4/2006 | Arteaga | |
| 7,043,477 B2 | 5/2006 | Mercer et al. | |
| 7,047,092 B2 | 5/2006 | Wimsatt | |
| 7,047,315 B2 | 5/2006 | Srivastava | |
| D524,251 S | 7/2006 | Lim et al. | |
| 7,075,000 B2 | 7/2006 | Gang et al. | |
| 7,081,579 B2 | 7/2006 | Alcalde et al. | |
| 7,085,571 B2 | 8/2006 | Kalhan et al. | |
| 7,134,040 B2 | 11/2006 | Ayres | |
| 7,171,018 B2 | 1/2007 | Rhoads et al. | |
| 7,187,947 B1 | 3/2007 | White et al. | |
| 7,200,638 B2 | 4/2007 | Lake | |
| 7,203,753 B2 | 4/2007 | Yeager et al. | |
| 7,206,568 B2 | 4/2007 | Sudit | |
| 7,218,611 B2 | 5/2007 | Mimura et al. | |
| 7,240,106 B2 * | 7/2007 | Cochran et al. | 709/222 |
| 7,248,893 B2 | 7/2007 | Christensen et al. | |
| 7,249,367 B2 | 7/2007 | Bove, Jr. et al. | |
| 7,260,638 B2 * | 8/2007 | Crosbie | 709/229 |
| 7,266,595 B1 * | 9/2007 | Black et al. | 709/223 |
| 7,269,854 B2 | 9/2007 | Simmons et al. | |
| 7,272,357 B2 | 9/2007 | Nishiga et al. | |
| 7,277,955 B2 | 10/2007 | Elliott | |
| 7,292,588 B2 | 11/2007 | Milley et al. | |
| D559,197 S | 1/2008 | Lim et al. | |
| 7,319,379 B1 | 1/2008 | Melvin | |
| 7,325,043 B1 | 1/2008 | Rosenberg et al. | |
| 7,337,459 B1 * | 2/2008 | Tsutsui et al. | 725/59 |
| 7,340,768 B2 * | 3/2008 | Rosenberger | 726/4 |
| 7,343,160 B2 * | 3/2008 | Morton | 455/444 |
| 7,359,894 B1 | 4/2008 | Liebman et al. | |
| 7,373,109 B2 * | 5/2008 | Pohja et al. | 455/41.2 |
| 7,378,903 B2 | 5/2008 | Bates | |
| D575,800 S | 8/2008 | Kusano et al. | |
| D575,801 S | 8/2008 | Kusano et al. | |
| 7,454,518 B1 * | 11/2008 | Cain et al. | 709/238 |
| D582,429 S | 12/2008 | Kusano et al. | |
| 7,468,934 B1 | 12/2008 | Janik | |
| 7,472,353 B1 | 12/2008 | Wolff et al. | |
| 7,509,131 B2 | 3/2009 | Krumm et al. | |
| 7,512,702 B1 | 3/2009 | Srivastava et al. | |
| 7,516,212 B2 | 4/2009 | Nguyen et al. | |
| 7,525,289 B2 | 4/2009 | Janik et al. | |
| 7,571,014 B1 | 8/2009 | Lambourne et al. | |
| 7,613,736 B2 | 11/2009 | Hicken | |
| 7,620,404 B2 | 11/2009 | Chesnais et al. | |
| 7,643,894 B2 | 1/2010 | Braithwaite et al. | |
| 7,652,844 B2 | 1/2010 | Edwards et al. | |
| 7,660,601 B2 | 2/2010 | Janik et al. | |
| 7,668,832 B2 | 2/2010 | Yeh et al. | |
| 7,668,964 B2 | 2/2010 | Millington | |
| 7,684,815 B2 | 3/2010 | Counts et al. | |
| 7,696,816 B2 | 4/2010 | Bates | |
| 7,742,606 B2 | 6/2010 | Kreifeldt et al. | |
| 7,768,234 B2 | 8/2010 | Janik et al. | |
| 7,786,705 B2 | 8/2010 | Janik et al. | |
| 7,792,311 B1 | 9/2010 | Holmgren et al. | |
| 7,805,682 B1 | 9/2010 | Lambourne | |
| 7,904,579 B2 | 3/2011 | Janik et al. | |
| 7,920,824 B2 | 4/2011 | Janik et al. | |
| 8,010,601 B2 * | 8/2011 | Jennings et al. | 709/204 |
| 8,024,431 B2 * | 9/2011 | Hoffman | 709/220 |
| 2001/0032335 A1 * | 10/2001 | Jones | 725/105 |
| 2001/0039659 A1 | 11/2001 | Simmons et al. | |
| 2001/0048449 A1 | 12/2001 | Baker | |
| 2001/0053994 A1 | 12/2001 | Atcheson et al. | |
| 2002/0007418 A1 | 1/2002 | Hegde et al. | |
| 2002/0013852 A1 | 1/2002 | Janik | |
| 2002/0019829 A1 | 2/2002 | Shapiro | |
| 2002/0032019 A1 | 3/2002 | Marks et al. | |
| 2002/0049760 A1 | 4/2002 | Scott et al. | |
| 2002/0086659 A1 | 7/2002 | Lauper | |
| 2002/0086676 A1 | 7/2002 | Hendrey et al. | |
| 2002/0138630 A1 | 9/2002 | Solomon et al. | |
| 2002/0144259 A1 | 10/2002 | Gutta et al. | |
| 2002/0151327 A1 * | 10/2002 | Levitt | 455/556 |
| 2002/0166123 A1 | 11/2002 | Schrader et al. | |
| 2002/0168938 A1 | 11/2002 | Chang | |
| 2002/0173273 A1 | 11/2002 | Spurgat et al. | |
| 2002/0174243 A1 | 11/2002 | Spurgat et al. | |
| 2002/0174426 A1 | 11/2002 | Gutta et al. | |
| 2002/0194260 A1 | 12/2002 | Headley et al. | |
| 2002/0194619 A1 | 12/2002 | Chang et al. | |
| 2003/0011467 A1 * | 1/2003 | Suomela | 340/7.1 |
| 2003/0014759 A1 | 1/2003 | Van Stam | |
| 2003/0022675 A1 * | 1/2003 | Mergler | 455/456 |
| 2003/0050062 A1 * | 3/2003 | Chen et al. | 455/435 |
| 2003/0065721 A1 | 4/2003 | Roskind | |
| 2003/0093790 A1 | 5/2003 | Logan et al. | |
| 2003/0147624 A1 | 8/2003 | Trajkovic et al. | |
| 2003/0182315 A1 | 9/2003 | Plastina et al. | |
| 2003/0204439 A1 | 10/2003 | Cullen, III | |
| 2003/0212802 A1 * | 11/2003 | Rector et al. | 709/228 |
| 2003/0217102 A1 | 11/2003 | Jystad et al. | |
| 2003/0225834 A1 | 12/2003 | Lee et al. | |
| 2003/0227478 A1 | 12/2003 | Chatfield | |
| 2003/0229549 A1 * | 12/2003 | Wolinsky et al. | 705/27 |
| 2003/0229900 A1 | 12/2003 | Reisman | |
| 2003/0236843 A1 | 12/2003 | Weber et al. | |
| 2004/0002938 A1 | 1/2004 | Deguchi | |
| 2004/0024912 A1 * | 2/2004 | Fukao et al. | 709/249 |
| 2004/0031058 A1 | 2/2004 | Reisman | |
| 2004/0055014 A1 | 3/2004 | Edelson | |
| 2004/0057348 A1 | 3/2004 | Shteyn et al. | |
| 2004/0078382 A1 | 4/2004 | Mercer et al. | |
| 2004/0086120 A1 | 5/2004 | Akins, III et al. | |
| 2004/0103280 A1 * | 5/2004 | Balfanz et al. | 713/169 |
| 2004/0107219 A1 * | 6/2004 | Rosenberger | 707/104.1 |

(56) References Cited

U.S. PATENT DOCUMENTS

| | | | |
|---|---|---|---|
| 2004/0119894 A1 | 6/2004 | Higgins et al. | |
| 2004/0133914 A1 | 7/2004 | Smith et al. | |
| 2004/0148393 A1 | 7/2004 | Breiter et al. | |
| 2004/0160307 A1* | 8/2004 | Saikkonen et al. | 340/5.74 |
| 2004/0162830 A1 | 8/2004 | Shirwadkar et al. | |
| 2004/0181604 A1 | 9/2004 | Immonen | |
| 2004/0199661 A1* | 10/2004 | Murdock | 709/238 |
| 2004/0205028 A1 | 10/2004 | Verosub et al. | |
| 2004/0225519 A1* | 11/2004 | Martin | 705/1 |
| 2004/0246372 A1 | 12/2004 | Megeid | |
| 2004/0249708 A1 | 12/2004 | Jacobs et al. | |
| 2004/0255340 A1 | 12/2004 | Logan | |
| 2004/0260407 A1 | 12/2004 | Wimsatt | |
| 2004/0260786 A1 | 12/2004 | Barile | |
| 2004/0267899 A1 | 12/2004 | Rahman et al. | |
| 2005/0015800 A1 | 1/2005 | Holcomb | |
| 2005/0021369 A1 | 1/2005 | Cohen et al. | |
| 2005/0021470 A1 | 1/2005 | Martin et al. | |
| 2005/0025320 A1* | 2/2005 | Barry | 381/119 |
| 2005/0033780 A1 | 2/2005 | Simelius et al. | |
| 2005/0038876 A1 | 2/2005 | Chaudhuri | |
| 2005/0050027 A1 | 3/2005 | Yeh et al. | |
| 2005/0058109 A1* | 3/2005 | Ekberg | 370/338 |
| 2005/0059379 A1* | 3/2005 | Sovio et al. | 455/411 |
| 2005/0060264 A1 | 3/2005 | Schrock et al. | |
| 2005/0060350 A1 | 3/2005 | Baum et al. | |
| 2005/0071221 A1 | 3/2005 | Selby | |
| 2005/0071881 A1 | 3/2005 | Deshpande | |
| 2005/0091693 A1 | 4/2005 | Amine et al. | |
| 2005/0102379 A1* | 5/2005 | Su et al. | 709/219 |
| 2005/0113946 A9 | 5/2005 | Janik | |
| 2005/0120373 A1 | 6/2005 | Thomas et al. | |
| 2005/0138193 A1* | 6/2005 | Encarnacion et al. | 709/230 |
| 2005/0160270 A1 | 7/2005 | Goldberg et al. | |
| 2005/0165888 A1 | 7/2005 | Elliott | |
| 2005/0174975 A1 | 8/2005 | Mgrdechian et al. | |
| 2005/0187976 A1 | 8/2005 | Goodman et al. | |
| 2005/0197846 A1 | 9/2005 | Pezaris et al. | |
| 2005/0210507 A1 | 9/2005 | Hawkins et al. | |
| 2005/0234995 A1 | 10/2005 | Plastina et al. | |
| 2005/0240494 A1 | 10/2005 | Cue et al. | |
| 2005/0245233 A1* | 11/2005 | Anderson | 455/411 |
| 2005/0251453 A1* | 11/2005 | Lu | 705/26 |
| 2005/0251565 A1 | 11/2005 | Weel | |
| 2005/0251566 A1 | 11/2005 | Weel | |
| 2005/0251576 A1 | 11/2005 | Weel | |
| 2005/0251807 A1 | 11/2005 | Weel | |
| 2005/0262204 A1 | 11/2005 | Szeto et al. | |
| 2005/0267944 A1 | 12/2005 | Little, II | |
| 2005/0272413 A1 | 12/2005 | Bourne | |
| 2006/0020662 A1 | 1/2006 | Robinson | |
| 2006/0059260 A1 | 3/2006 | Kelly et al. | |
| 2006/0059528 A1* | 3/2006 | Katayama et al. | 725/114 |
| 2006/0085419 A1 | 4/2006 | Rosen | |
| 2006/0085821 A9 | 4/2006 | Simmons et al. | |
| 2006/0087926 A1 | 4/2006 | Hwang | |
| 2006/0123080 A1 | 6/2006 | Baudino et al. | |
| 2006/0135059 A1 | 6/2006 | Hill | |
| 2006/0143236 A1 | 6/2006 | Wu | |
| 2006/0149628 A1 | 7/2006 | Chefalas et al. | |
| 2006/0149631 A1 | 7/2006 | Brazell et al. | |
| 2006/0167576 A1 | 7/2006 | Rosenberg | |
| 2006/0168264 A1 | 7/2006 | Baba et al. | |
| 2006/0212442 A1 | 9/2006 | Conrad et al. | |
| 2006/0212444 A1 | 9/2006 | Handman et al. | |
| 2006/0212478 A1 | 9/2006 | Plastina et al. | |
| 2006/0218180 A1 | 9/2006 | Bodlaender et al. | |
| 2006/0218225 A1 | 9/2006 | Hee Voon et al. | |
| 2006/0223518 A1 | 10/2006 | Haney | |
| 2006/0229939 A1 | 10/2006 | Bhakta et al. | |
| 2006/0240856 A1 | 10/2006 | Counts et al. | |
| 2006/0256669 A1 | 11/2006 | Sakuma et al. | |
| 2006/0287746 A1 | 12/2006 | Braithwaite et al. | |
| 2006/0287915 A1 | 12/2006 | Boulet et al. | |
| 2006/0294201 A1 | 12/2006 | Kito et al. | |
| 2006/0294212 A1 | 12/2006 | Kikkawa et al. | |
| 2007/0025194 A1 | 2/2007 | Morse et al. | |
| 2007/0038999 A1 | 2/2007 | Millington | |
| 2007/0121843 A1 | 5/2007 | Atazky et al. | |
| 2007/0136132 A1 | 6/2007 | Weiser et al. | |
| 2007/0168254 A1 | 7/2007 | Steelberg et al. | |
| 2007/0168388 A1 | 7/2007 | Plastina et al. | |
| 2007/0174243 A1 | 7/2007 | Fritz | |
| 2007/0180063 A1 | 8/2007 | Qureshey et al. | |
| 2007/0205276 A1 | 9/2007 | Sodan et al. | |
| 2007/0218867 A1 | 9/2007 | Mononen et al. | |
| 2007/0219996 A1 | 9/2007 | Jarvinen | |
| 2007/0220552 A1 | 9/2007 | Juster et al. | |
| 2007/0247979 A1 | 10/2007 | Brillon et al. | |
| 2007/0249327 A1 | 10/2007 | Nurmi | |
| 2007/0260508 A1 | 11/2007 | Barry et al. | |
| 2007/0271136 A1 | 11/2007 | Strauss et al. | |
| 2008/0016205 A1 | 1/2008 | Svendsen | |
| 2008/0033809 A1 | 2/2008 | Black et al. | |
| 2008/0033821 A1 | 2/2008 | Jacobi et al. | |
| 2008/0097999 A1 | 4/2008 | Horan | |
| 2008/0109095 A1 | 5/2008 | Braithwaite et al. | |
| 2008/0114481 A1 | 5/2008 | Braithwaite et al. | |
| 2008/0133520 A1 | 6/2008 | Hempleman et al. | |
| 2008/0176511 A1 | 7/2008 | Tan et al. | |
| 2008/0182591 A1 | 7/2008 | Krikorian | |
| 2008/0288375 A1* | 11/2008 | Uhrig et al. | 705/30 |
| 2009/0030999 A1* | 1/2009 | Gatzke et al. | 709/207 |
| 2009/0055229 A1 | 2/2009 | Lidgren et al. | |
| 2009/0085724 A1* | 4/2009 | Naressi et al. | 340/10.6 |
| 2009/0193472 A1 | 7/2009 | Braithwaite et al. | |
| 2009/0315670 A1* | 12/2009 | Naressi et al. | 340/5.8 |
| 2010/0172512 A1 | 7/2010 | Braithwaite et al. | |
| 2011/0026727 A1 | 2/2011 | Braithwaite et al. | |
| 2011/0044468 A1 | 2/2011 | Braithwaite et al. | |
| 2011/0044469 A1 | 2/2011 | Braithwaite et al. | |

FOREIGN PATENT DOCUMENTS

| | | |
|---|---|---|
| WO | 99/05877 A1 | 2/1999 |
| WO | 00/04730 A1 | 1/2000 |
| WO | 01/24551 A1 | 4/2001 |
| WO | 02/29506 A2 | 4/2002 |
| WO | 02/062092 A1 | 8/2002 |
| WO | 2006/082566 A1 | 8/2006 |

OTHER PUBLICATIONS

"Instant Messenger—AIM—Instant Message Your Online Buddies for Free—AIM," http://dashboard.aim.com/aim, copyright 2007 AOL LLC, printed Nov. 8, 2007, 6 pages.

"Windows Live Messenger—Overview," http://get.live.com/messenger/overview, copyright 2007 Microsoft Corp., printed Nov. 28, 2007, 1 page.

"Bluetooth.com—Learn," http://www.bluetooth.com/Bluetooth/Learn/, copyright 2007 Bluetooth SIG, Inc., printed Oct. 26, 2007, 1 page.

"Dodgeball.com :: mobile social software," http://www.dodgeball.com/, copyright 2008 Google Inc., printed Jan. 16, 2008, 1 page.

"eHarmony," http://eharmony.com/, copyright 2000-2008 eHarmony.com, printed Jan. 16, 2008, 1 page.

"Flickr," http://www.flickr.com/, copyright 2008 Yahoo! Inc., printed Jan. 16, 2008, 1 page.

"Friendster—Home," http://www.friendster.com/, copyright 2002-2007 Friendster, Inc., printed Jan. 16, 2008, 1 page.

"Google Talk," http://www.google.com/talk/, copyright 2008 Google, printed Jan. 16, 2008, 1 page.

"iChat. Not being there is half the fun," http://www.apple.com/macosx/features/ichat.html, printed Jan. 16, 2008, 1 page.

"Icq," http://www.icq.com/, copyright 1998-2008 ICQ Inc., printed Jan. 16, 2008, 2 pages.

"IEEE 802.11," http://en.wikipedia.org/wiki/IEEE_802.11, printed Oct. 26, 2007, 5 pages.

"Anthem—Overview," http://www.intercastingcorp.com/platform/anthem, copyright 2004-2007 Intercasting Corp., printed Jan. 16, 2008, 2 pages.

(56) References Cited

OTHER PUBLICATIONS

"Apple—iPod classic," http://www.apple.com/ipodclassic/, printed Oct. 26, 2007, 1 page.
"Jabber SoftwareFoundation," http://www.jabber.org/, copyright 1999-2005 the Jabber Software Foundation, printed Jan. 16, 2008, 3 pages.
"Lavalife Where singles click," http://lavalife.com/, copyright 2006 Lavalife Corp., printed Jan. 16, 2008, 1 page.
"Dating Service—Singles, Personals and Love, Match.com," http://www.match.com/, copyright 2008 Match.com, printed Jan. 16, 2008, 2 pages.
"MySpace," http://www.myspace.com/, copyright 2003-2008 MySpace.com, printed Jan. 16, 2008, 2 pages.
"Mobile community, free sms, mobile dating, text flirting and friends networking—playtxt . . . ," http://web.archive.org/web/20070225125113rn_1/www.playtxt.net/playtxt.do, printed Janaury 16, 2008, 1 page.
"Rabble—Social networking for your phone," http://www.rabble.com/, copyright 2005-2008 Intercasting Corp, printed Jan. 16, 2008, 1 page.
"SmallPlanet: Home," http://web.archive.org/web/20061105030323/http://www.smallplanet.net/, copyright 2005 SmallPlanet.net, printed Jan. 16, 2008, 1 page.
"Yahoo! Messenger," http://messenger.yahoo.com/webmessengerpromo.php, copyright 2007 Yahoo! Inc., printed Oct. 26, 2007, 1 page.
"Yahoo! Personals," http://personals.yahoo.com/us/homepage/splash, copyright 2008 Yahoo! Inc., printed Jan. 16, 2008, 2 pages.
"Zune," http://www.zune.net/en-US/, copyright 2008 Microsoft Corporation, printed Jan. 16, 2008, 1 page.
"MyStrands Labs: Patent-pending Technologies," http://labs.mystrands.com/patents.html, printed Feb. 7, 2007, 5 pages.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"Billboard Music Charts—Latest Music News—Music Videos," http://www.billboard.com/bbcom/index.jsp, printed Feb. 7, 2007, 2 pages.
"CNN.com—Breaking News, U.S., World, Weather, Entertainment & Video News," http://www.cnn.com, copyright 2007 Cable News Network LP, LLLP, printed Feb. 7, 2007, 3 pages.
"InferNote is an exploration tool for your music collection," http://www.itweaks.com/infdoc/index.html, copyright 2004 otherslikeyou.com Inc., printed Feb. 7, 2007, 13 pages.
"Rhapsody—Full-length music, videos and more—FREE," http://www.rhapsody.com/welcome.html, copyright 1948-2007 Muze Inc., copyright 2001-2007 Listen.com, printed Feb. 7, 2007, 1 page.
"National and Local Weather Forecast, Radar, Map and Report," http://www.weather.com/, copyright 1995-2007 The Weather Channel Interactive, Inc., printed Feb. 7, 2007, 3 pages.
Goombah—Preview, http://www.goombah.com/preview.html, printed Jan. 8, 2008, 5 pages.
"Apple—iPod + iTunes," http://www.apple.com/itunes/, copyright 2007 Paramount Pictures, printed Feb. 7, 2007, 2 pages.
"Roxio the Boom Box Music and recording reviews—CNET Reviews," http://reviews.cnet.com/music-and-recording/roxio-the-boom-box/4505-3669_7-3141440 . . . , printed Nov. 15, 2007, 4 pages.
"Napster.co.uk—Napster to Go," http://www.napster.co.uk/ntg.html, copyright 2003-2007 Napster, LLC, printed Nov. 15, 2007, 2 pages.
"Start Listening with Last.fm," http://www.last.fm/, 1 page.
"MSN—Music," http://music.msn.com/help/sync, copyright 2007 Microsoft, printed Nov. 16, 2007, 1 page.
Jeff Mascia et al., "Lifetrak: Music in Tune With Your Life," copyright 2006 ACM, 11 pages.
Jun Wang et al., "Music Recommender System for Wi-Fi Walkman," No. ICT-2003-01 in the ICT Group Technical Report Series, 23 pages.
"Musicstrands.com Because Music is Social," copyright 2006 MusicStrands, Inc., 2 pages.
"MyStrands for Windows," http://www.mystrands.com/overview.vm, copyright 2003-2007 MediaStrands, Inc., printed Feb. 7, 2007, 3 pages.
"UpTo11.net—Music Recommendations and Search," http://www.upto11.net/, copyright 2005-2006 Upto11.net, printed Feb. 7, 2007, 1 page.
"LAUNCHcast Radio—Yahoo! Messenger," http://messenger.yahoo.com/launch.php, copyright 2007 Yahoo! Inc., printed Nov. 8, 2007, 1 page.
"Pandora Internet Radio—Find New Music, Listen to Free Web Radio," http://www.pandora.com/, copyright 2005-2007 Pandora Media, Inc., printed Feb. 7, 2007, 1 page.
"Google AdWords: Regional and Local Targeting," https://adwords.google.com/select/targeting.html, copyright 2008 Google, printed Jul. 17, 2008, 1 page.
"Technology—Geo Targeting," http://www.invidi.com/pages/itc_technology_05.html, copyright 2007, printed Nov. 18, 2008, 1 page.
"IP Multimedia Subsystem," http://en.wikipedia.org/wiki/IP_Multimedia_Subsystem, printed Jul. 8, 2009, 11 pages.
Kevin C. Almeroth et al., "An Alternative Paradigm for Scalable On-Demand Applications: Evaluating and Deploying the Interactive Multimedia Jukebox," IEEE Transactions on Knowledge and Data Engineering, vol. 11, No. 4, Jul./Aug. 1999, pp. 658-672, copyright 1999 IEEE, 15 pages.
K. Debique, et al., Content Directory:1 Service Template Version 1.01 for UPnP Version 1.0, Standardized DCP, Jun. 25, 2002, Copyright 1999-2002 Contributing Members of the UPnP Forum, 89 pages.
"Digital Home White Paper," IS 2003-31, Jun. 2003, <www.caba.org. 14 pages.
"Digital Home Working Group Design Guidelines," Version 1.0, Working Draft, Apr. 1, 2004, Copyright 2004 Digital Home Working Group, 160 pages.
Ritchie, J., et al., "UPnP AV Architecture: 0.83 for UPnP Version 1.0," Preliminary Design, Jun. 12, 2002, Copyright 2000 Contributing Members of the UPnP Forum, 22 pages.
J. Ritchie, et al., "UPnP AV Architecture:1 for UPnP Version 1.0," Approved Design Document, Jun. 25, 2002, Copyright 2000-2002 Contributing Members of the UPnP Forum, 22 pages.

* cited by examiner

DEVICE DISCOVERY FOR DIGITAL ENTERTAINMENT NETWORK

RELATED APPLICATIONS

The present application is a Divisional of U.S. patent application Ser. No. 10/840,108, filed May 5, 2004, entitled "DEVICE DISCOVERY FOR DIGITAL ENTERTAINMENT NETWORK," which is hereby incorporated herein by reference in its entirety.

FIELD OF THE INVENTION

The present invention relates generally to a method and system for playing music. The present invention relates more particularly to a digital entertainment network wherein playlists are obtained by communicating attributes of the playlists to a playlist server and wherein songs are obtained by communicating information representative of the songs to a content server.

BACKGROUND OF THE INVENTION

Traditionally, music has been provided to listeners by either a broadcast method or a purchase method. According to the broadcast method, music is broadcast to listeners by such means as radio and cable systems. The owners of the music are typically compensated by the broadcaster via either the American Society of Composers, Authors and Publishers (ASCAP) or Broadcast Music Incorporated (BMI). These two agencies monitor the playing of music by broadcasters, collect royalties from the broadcasters, and distribute the royalties to the copyright owners of the music.

However, according to the broadcast method the listener has little or no control over which selections are played. Generally, a listener must tune in to a radio station or select a cable channel that plays the type of music that the listener enjoys with the expectation that songs that the listener enjoys will occasionally be played. Too frequently, these songs are not played as often as the listener would prefer.

According to the purchase method, a listener purchases prerecorded music stored on media such as compact discs (CDs). The listener may then play the songs as many times as desired. Copyright owners are paid royalties out of the purchase price of the music.

However, the purchase method requires that a substantial price be paid for the music, at least in part because of the virtually unlimited use associated therewith. Listeners appear to be becoming less willing to pay the purchase price for such prerecorded music, particularly as alternative methods for obtaining music become more popular.

The purchase method suffers from the additional disadvantage of requiring that media containing the desired songs be utilized. Such media is somewhat bulky, particularly when a large number of selections are desired. In some instances, it may not be practical to carry all of the songs desired because of the volume and/or weight of the media required. Such media is also undesirably subject to degradation due to use and mishandling. For example, scratches on a CD may inhibit its use.

A newer method of providing music to listeners is becoming increasingly popular. It is this method of providing music that is apparently making listeners less willing to pay the purchase price for music that is prerecorded on media. According to this newer method of providing music, the music is downloaded from the Internet or otherwise obtained (such as by trading with friends), as a data file. One popular example of such a data file is an MP3 file. MP3 is short for Moving Picture Experts Group 1, audio layer 3.

Although music embodied in data files can be obtained legitimately, such as via such services like iTunes (a trademark of Apple Computer, Inc.), the opportunity to download or trade music data files for free has heretofore hampered this legitimate method of obtaining music.

As such, although the prior art has recognized, to a limited extent, the problem of distributing music, the proposed solutions have, to date, been ineffective in providing a satisfactory remedy. Therefore, it is desirable to provide a method for distributing music that is convenient, does not involve the use of media, and which provides for the payment of royalties.

SUMMARY OF THE INVENTION

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The present invention specifically addresses and alleviates the above mentioned deficiencies associated with the prior art. More particularly, according to one aspect the present invention comprises a method for playing music, wherein the method comprises displaying a list of playlists names, selecting one of the displayed playlist names, sending at least one attribute of a playlist corresponding to the selected playlist name to a playlist server, receiving a playlist from the playlist server wherein the received playlist corresponds to the attribute(s), selecting at least one song from the received playlist, sending information representative of the selected song(s) to a content server, receiving the selected song(s) from the content server and playing the selected song(s).

According to one method of operation, the playlist names are displayed on a first device, a playlist name is selected on the first device, the attribute(s) are sent from the first device, the playlist is received by the first device, a song is selected from the first device, and the song is played on the first device.

According to another method of operation, the playlist names are displayed on a first device, a playlist name is selected on the first device, the attribute(s) are sent from the first device, the playlist is received by the first device, a song is selected from the first device, and the song is played on a second device.

The method of the present invention optionally comprises selecting the second device. In this instance, the playlist names are displayed on a first device, the playlist name is selected on the first device, the attribute(s) are sent from the first device to the second device, the second device receives the playlist from the content server based on the attributes, the song is selected from the first device, and the song is played on the selected second device. Preferably, the second device is selected from the first device.

Preferably, the first device comprises a handheld portable device. For example, the first device may comprise a palmtop computer (PDA), a regular computer, or an MP3 player, or a remote control for a second device.

Thus, the first device may comprise a remote control for a second device wherein the second device comprises a music rendering device. In this instance, songs are typically played upon the second device, although songs may also be played upon the first device.

Preferably, selecting one of the displayed playlist names and selecting a song from the playlist are performed using a touchscreen. If a second device is selected from the first device, the second device is also preferably selected using the touchscreen.

Preferably, communicating attributes of a playlist to a playlist server comprises communicating a name of a playlist to a playlist server. Communicating attributes of a playlist to a playlist server may comprise communicating to the playlist server at least one attribute such as a type of music listened to, at least one artist, at least one selection, at least one instrument, at least one record company, a region, a country, a state, a city, a school, and/or an ethnicity. The playlist server may then either locate or make a playlist that conforms to the attribute(s) of the requested playlist.

Sending at least one attribute of a playlist to a playlist server and receiving a playlist from the playlist server preferably comprises communicating the attribute(s) and the playlist via a network, preferably a wide area network such as the Internet.

Selecting at least one song from the playlist optionally comprises selecting a plurality of songs from the playlist and playing the selected song(s) then comprises playing the plurality of songs. The songs may be played in the order selected, in random order, or in any other desired order.

According to one aspect of the present invention, playlist recommendations based upon listening habits of a listener are automatically provided to the listener. Alternatively, the playlist recommendations may be based upon listening habits of another person. The playlist recommendations may comprise a list of currently popular songs within a single genre that is of interest to the listener.

Preferably, at least one parameter for a song that is being played on a second device can be adjusted from the first device. The parameters may include volume, tone, and/or balance.

According to one aspect, the present invention comprises a method for playing music, wherein the method comprises obtaining a playlist for a first device via the Internet, selecting a song from the playlist, and using the first device to cause a second device to play the selected song. The second device preferably obtains the song via the Internet.

According to one aspect, the present invention comprises a method for playing music, wherein the method comprises displaying a list of playlist names on a first device, selecting one of the displayed playlist names from the first device, sending at least one attribute of a playlist corresponding to the selected playlist name from the first device to a playlist server, receiving a playlist at the first device from the playlist server wherein the received playlist corresponds to the attribute(s), selecting at least one song from the playlist on the first device, sending information representative of the selected song from the first device to a content server, receiving the selected song at the first device from the content server, and playing the selected song(s) on the first device.

According to one aspect, the present invention comprises a method for playing music, wherein the method comprises displaying a list of playlist names on a first device, selecting one of the displayed playlist names from the first device, sending at least one attribute of a playlist corresponding to the selected playlist name from the first device to a playlist server, receiving at the first device a playlist from the playlist server wherein the received playlist corresponds to the attribute(s), selecting a second device, selecting at least one song from the playlist on the first device, sending information representative of the selected song from the first device to the second device, sending information representative of the selected song from the second device to a content server, receiving the selected song at the second device from the content server, and playing the selected song(s) on the second device.

Alternatively, the first device receives a playlist (artist, album, song, custom mix, etc.) The user selects the playlist. The playlist attributes (i.e. Playartist=12) are sent to the second device. The second device sends the attributes to the content server and receives the same playlist as the first device, since this playlist is based upon the same attributes. The second device receives the playlist and starts playing.

According to one aspect, the present invention comprises a device for playing music, wherein the device comprises a display for displaying a list of playlist names and song names. The display is also for facilitating selection of playlists and songs. The device further comprises a network transceiver.

As used herein, the term network transceiver includes any circuit or device that facilitates communication via a network. Examples of network transceivers include Ethernet network interface cards (NICs) and circuits, as well as Bluetooth and WiFi cards and circuits.

The device is configured to facilitate displaying a list of playlist names on the display, selecting one of the displayed playlist names, sending at least one attribute of a playlist corresponding to the selected playlist name to a playlist server via the network transceiver, and receiving a playlist from the playlist server via the network transceiver. The received playlist corresponds to the attribute(s) sent to the playlist server. The device is further configured to facilitate selecting at least one song from the playlist, sending information representative of the selected song to a content server, receiving the selected song from the content server, and playing the selected song(s).

According to one aspect, the present invention comprises a device for playing music, wherein the device comprises a network transceiver. The device is configured to facilitate receiving information representative of a song from another device, sending of the information representative of the song to a content server via the network transceiver, receiving of the song from the content server, and playing of the song.

According to one aspect, the present invention comprises a playlist server comprising a memory within which a plurality of playlists are stored and a network transceiver. The playlist server is configured to facilitate receiving at least one attribute of a playlist via the network transceiver, identifying a playlist based upon the attribute(s), and sending of the playlist to a device via the transceiver.

Preferably, the playlist server is further configured to facilitate serving of content. Thus, the playlist server and the content server are effectively the same server. However, as those skilled in the art will appreciate, the playlist server and the content server may be two entirely different servers and may be located in diverse locations with respect to one another.

According to one aspect, the present invention comprises a method for providing music, wherein the method comprises receiving at least one attribute of a selected playlist at a playlist server and transmitting a playlist that corresponds to the attributes from the playlist server to a first device.

According to one aspect, the present invention comprises a system for playing music, wherein the system comprises a first device configured to display names of playlists and names of songs and to facilitate selection of the playlists and songs, a playlist server configured to receive at least one attribute of a playlist from the first device and to send a playlist corresponding to the received attribute(s) to the first device, and a content server configured to receive information representative of at least one song from the first device and to send corresponding songs to the first device. The present invention further comprises at least one second device configured to send attributes of a playlist to the playlist server, to send information representative of songs to the content server, to receive a playlist from the playlist server, and to receive songs from the content server.

According to one aspect, the present invention comprises a method for playing music, wherein the method comprises providing a first device that repeatedly wirelessly broadcasts a unique identification thereof and a password, and moving the first device into an area such that it can communicate wirelessly with at least one second device that repeatedly wirelessly broadcasts a unique identification thereof and a password. The first device displays names of the second device(s) for which the password is an authorized password for the first device, such that the first device can be used to select songs to be played on the second device(s). Each of the second devices displays the name of the first device when the password of the first device is an authorized password for the that second device, such that the second device can be used to select songs to be played on the first device.

According to one aspect, the present invention comprises a system for playing music, wherein the system comprises a playlist server in communication with the Internet wherein the playlist server has a plurality of playlists stored thereon, a content server in communication with the Internet wherein the content server has a plurality of songs stored thereon, a rendering device for playing songs, a set-top box in communication with the rendering device for facilitating communication of the songs from the content server to the rendering device via the Internet, and a remote control for controlling the set-top box.

The remote control is configured to obtain a playlist from the playlist server, facilitate selection of a song from the playlist, and control the set-top box so as to cause the set-top box to download the same playlist and cause the song to play on the rendering device.

The remote control is preferably dockable to the set-top box. The remote control may be either in wired or wireless communication with the set-top box when docked thereto. The remote control is preferably in wireless communication with the set-top box when the remote control is not docked thereto. The remote control can preferably be used to control the set-top box whether the remote control is docked thereto or not.

The remote control preferably comprises a display and a keypad for facilitating control of the set-top box and consequently for facilitating control of the rendering device. The set-top box optionally comprises a display and a keypad for facilitating control thereof and consequently for facilitating control of the rendering device.

According to one aspect, the present invention comprises a method for providing content, wherein the method comprises selecting content from a remote control and providing the selected content to a media player via a network.

These, as well as other advantages of the present invention, will be more apparent from the following description and drawings. It is understood that changes in the specific structure shown and described may be made within the scope of the claims, without departing from the spirit of the invention.

BRIEF DESCRIPTION OF THE DRAWING FIGURES

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Figure 1:
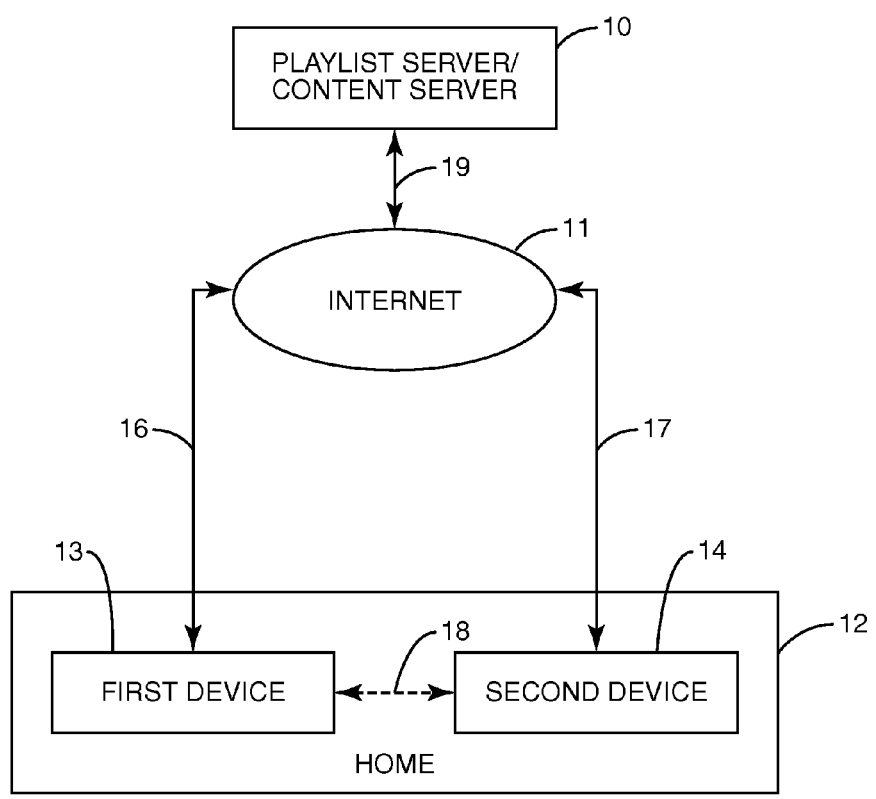
FIG. 1 is a block diagram showing an exemplary embodiment of the digital entertainment system of the present invention.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

Thus, the detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions may be accomplished by different embodiments that are also intended to be encompassed within the spirit of the invention.

The digital entertainment network of the present invention is preferably a fully integrated plug and play technology platform that delivers secure anytime, anywhere, on-demand multimedia content for digital home systems.

The digital entertainment network provides efficient and ubiquitous wireless and web-enabled control over digital home systems by enabling users to access and manage music content using a variety of control devices and by delivering such content to a wide variety of different rendering devices.

On-demand delivery of content, such as streaming music, is provided utilizing such user-friendly features such as customized playlists, collaboration, music management tools, and search capability.

The present invention preferably provides a plug and play control point that has the software intelligence that forms the basis for a truly integrated entertainment network system. This control point architecture delivers the ability to unify content, such as music or other types of multimedia content, with control applications that enable system users to access content from a variety of different remote control devices and deliver such content to a variety of rendering devices.

For example, the control point enables a digital entertainment network user to utilize a PDA or other device to browse for music on the Internet, then select and play a song on an MP3 player or the like, or even on stand-alone audio speakers. In another embodiment, the control point allows a user to choose a song via a set-top device, then play that music on a television, stereo system, or the like.

Preferably, the present invention comprises a web services based component that provides users with on-demand music streamed to a variety of devices, such as MP3 players, set-top boxes and home stereo systems. Thus, according to one aspect, the present invention is a web-based content and music management system that offers users a number of desirable features via a web browser.

These features preferably include web-based music catalog browsing via jukebox interface, search capability (to find artists and specific selections), the use of standard playlists, the use of custom playlists (created by each user), the ability to select different devices on which to play songs, the ability to view a user's activity over a given time period or in real-time with the activity streamer, collaboration, the ability to find buddies with the same music preferences you have in your playlists, the ability to share playlists with buddies, the ability to view buddies' activity based on various time periods, instant messaging for chatting among users, and the use of a set top box to facilitate the use of playlists and the streaming of content.

According to one aspect, the digital entertainment network of the present invention comprises a set-top box that provides users with on-demand music streamed to a variety of devices. The set-top box is a web-based content and music management system that offers users a list of features including the need for little or no setup (plug into Ethernet and video out, audio out), content catalog browsing, search capability (to find artists and specific selections), the use of standard playlists, the use of custom playlists (created by each user), the ability to select different devices on which to play songs, the ability to view your activity over a given time period or in real-time with the activity streamer, collaboration, the ability to find buddies with the same music preferences you have in your playlists, the ability to share playlists with buddies, the ability to view buddies' activity based on various time periods, and instant messaging for chatting among users.

The digital entertainment network of the present invention comprises control devices that allow users to communicate with the control point and give commands to render music/multimedia content on various different rendering devices. Examples of control devices include the personal digital assistant (PDAs) and set-top boxes.

According to one aspect of the present invention, a PDA based control application allows users to roam the house and play music content that is accessed via the PDA and is available via an Internet based service. According to one aspect, the content is played via set-top boxes, i.e., rendering devices, which may be located throughout the home.

The digital entertainment network also includes rendering devices that receive instructions from the control point and thereby render music/multimedia content. Rendering device examples include the set-top devices, home stereo systems and televisions. A variety of different types of rendering devices are possible. Audio content, such as music, may be rendered on audio rendering devices such as speakers, a stereo, and a television. Similarly, audio/video content, such as movies and television shows, may be rendered on televisions, stand alone monitors, and computer monitors. Indeed, either audio or audio/video content may be rendered on a variety of other types of devices, such as cellular telephones, PDAs, and laptop computers.

According to one aspect of the present invention, a set-top device is a key rendering device that plays music content on other rendering devices, such as televisions and stereo systems, throughout the home.

The digital entertainment network of the present invention optionally comprises a billing application for handling the financial transaction activities associated with streaming content payment and usage. The billing application preferably performs functions such as transaction and usage logging for billing processing, automated billing of customers, automated notification of the inability to charge a credit card on file (exception handling), and automated calculation and wire transfer of funds to content providers.

The present invention is illustrated in FIGS. 1-8, which depict presently preferred embodiments thereof.

Referring now to FIG. 1, a preferred embodiment of the present invention comprises a playlist server/content server 10 that is in communication with a network, preferably a wide area network such as the Internet 11. Also in communication with the network are a first device 13 and a second device 14, which are both typically located within a common structure, such as a home or office 12. The first device 13 generally assumes the function of the control point, although the second device 14 may have this functionality, as well.

The playlist server/content server 10 may be a single server. Alternatively, the playlist server and the content server may be two separate servers. Indeed, the playlist server may comprise a plurality of separate servers and/or the content server may similarly comprise a plurality of different servers.

The playlist server/content server is in bi-directional communication with the Internet 11, as indicated by arrow 19. The first device 13 is in bi-directional communication with the Internet 11, as indicated by arrow 16. The second device 14 is in bi-directional communication with the Internet 11, as indicated by arrow 17.

The first device is in communication with the second device, as indicated by arrow 18. The first device may be in either unidirectional or bi-directional communication with the second device 14.

The first device 13 may comprise any of a plurality of different types of devices. For example, the first device 13 may comprise a handheld portable device such as a personal digital assistant (PDA), a palmtop computer, an MP3 player, a telephone, or a remote control for a music rendering device. The first device may alternatively comprise a non-portable device, such as a desktop computer, a television, or a stereo.

The second device 14 may comprise the same type of device as the first device 14 or may alternatively comprise a different type of device with respect thereto. Thus, the first and second devices may comprise portable devices, non-portable devices, or any combination thereof.

The second device may also comprise one or more smart speakers. As defined herein, standalone smart speakers are speakers that are not connected to a device such as a stereo, television, or computer. Smart speakers are typically in communication with a network and can thus receive content therefrom. Typically, smart speakers comprise dedicated signal conditioning circuitry such as audio amplifiers.

According to one embodiment of the present invention, the first device 13 comprises a remote control for the second device 14. Thus, the second device may comprise a music rendering device such as a stereo, a television, or a home computer and the first device may comprise a handheld remote control therefor.

Any desired number of first and second devices may be provided according to the present invention. For example, the first device may comprise a remote control that controls a plurality of second devices, such as a television, a DVD player, and a stereo system.

Figure 2:
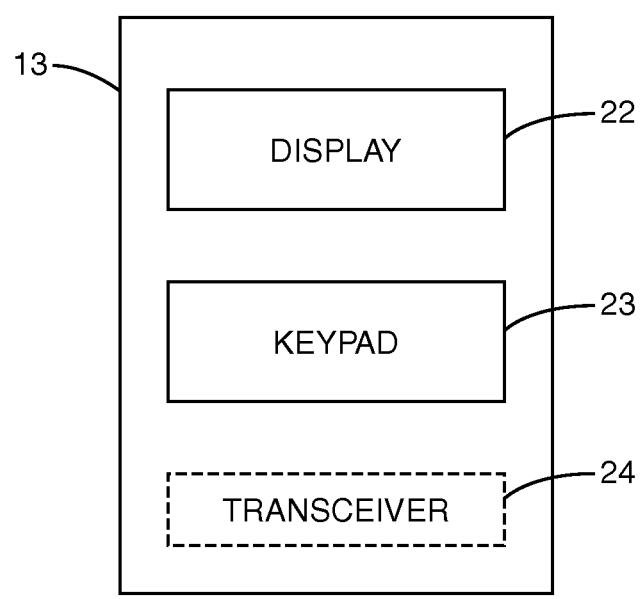
FIG. 2 is a block diagram showing further detail of an exemplary first device or remote control of FIG. 1.

Referring now to FIG. 2, the first device 13 may comprise a handheld portable device that comprises a display 22, a keypad 23, and a network transceiver 24. The display 22 facilitates viewing and selection of playlist names, as well as viewing and selection of songs within a playlist, as discussed in detail below. The keypad 23 facilitates selection of playlist names and selection of songs, as also discussed in detail below.

The display 22 may optionally comprise a touchscreen display and the keypad may optionally be omitted. In this instance, all selection may be performed via the touchscreen display.

The network transceiver 24 preferably comprises a wireless network transceiver, such network transceiver conforming to the Bluetooth (a trademark of Bluetooth SIG, Inc.) standard and/or conforming to the WiFi (a trademark of the WiFi Alliance) standard.

The device shown in FIG. 2 may also be the second device 14 according to one aspect of the present invention. However, for explanatory purposes it may sometimes be beneficial to think of the first device as a small handheld portable device such as a PDA or dedicated remote control that can function to control the second device and it may similarly sometimes be beneficial to think of the second device as a larger music rendering device such as a stereo, television, or personal computer. Of course, such embodiments of the present invention are by way of example only, and not by way of limitation.

Having described the general structures of the present invention, the general operation thereof will next be described with reference to FIGS. 3 and 4. In operation, the digital entertainment network of the present invention provides convenient access to a very large database of music without requiring that the music be stored and kept by the listener on media such as CDs. This convenient access is provided by maintaining the database of music at a remote location, i.e., in an Internet based content server 10.

That is, the present invention generally does not attempt to store songs within the music rendering devices themselves, but rather generally downloads songs via a network, as needed. Such operation simplifies the construction and operation of the music rendering devices by eliminating the need for large storage capacities. The elimination of the need for large storage capacities results in a cost savings for manufacturing and purchasing the music rendering devices.

Downloading the music on an as-needed basis provides access to a very large database of songs that contains many more selections than can be stored on contemporary music rendering devices. Downloading the music on an as-needed basis also facilitates the payment of royalties to the music owners in a manner that is fair to both listeners and music owners.

One exception to downloading of music on an as-needed basis according to the present invention is optionally the use of caching. Songs that are played repeatedly may be cached, so as to mitigate the need for a network connection and thus mitigate the need for the bandwidth associated therewith. The playing of cached songs can be reported via the network and royalties paid as though the song had been downloaded strictly on an as-needed basis.

Preferably, the present invention comprises a first device that may operate in two different ways. According to a first way of operation, as shown in FIG. 3 and discussed in detail below, a listener selects a song to be played from a playlist on the first device and the song is then played on the first device. According to a second way of operation, as shown in FIG. 4 and discussed in detail below, a listener selects a song to be played from a playlist on the first device and the song is then played on another device, e.g., a second device.

Figure 3:
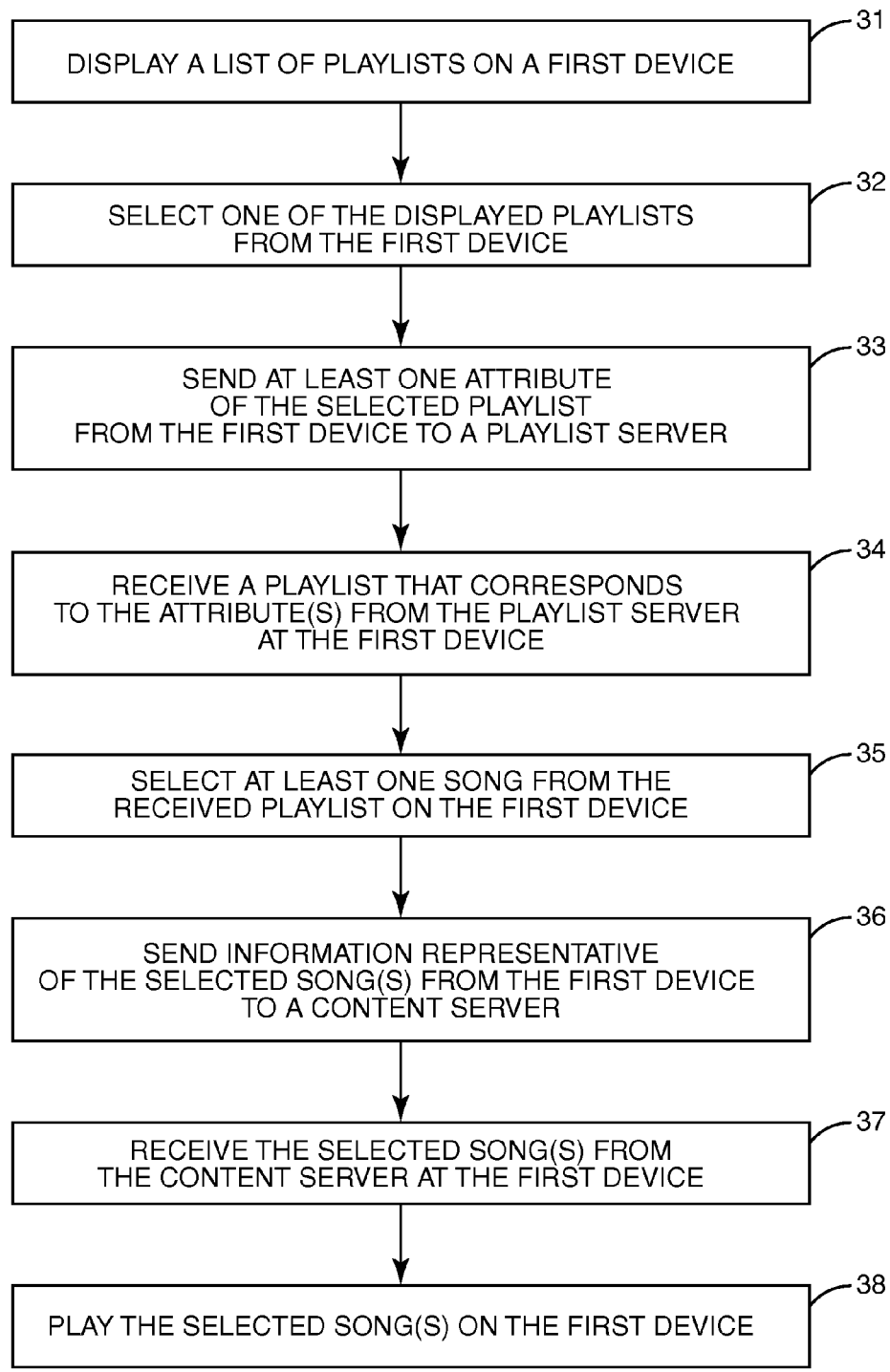
FIG. 3 is a flow chart showing one way of operating a digital entertainment system of the present invention.

Referring now to FIG. 3, the first way of operation of the first device is illustrated. A list of playlists is displayed on the first device as shown in block 31. The list of playlist is a list of playlist names, numbers, or other indicia indicative of individual playlists. For example, the list of playlists may include graphic symbols or icons in addition to or in place of other indicia. As used herein, the term playlist name includes any indicia that are uniquely representative of a playlist.

Each item on the list of playlists is representative of a particular playlist. Each playlist may come from any one of a variety of sources. For example, a playlist may be compiled by a user, a playlist may be obtained from someone else, or a playlist may be formed by a computer using an algorithm that attempts to identify songs that will suit the tastes of the listener.

The playlists are stored on a playlist server and are downloaded to the first device and the second device as requested by the listener. As mentioned above, the playlist server may be the same server as the content server.

Optionally, playlists as well as songs may be cached on the first device and/or the second device.

The list of playlists may be displayed upon the display 22 of the first device or may be displayed in any other desired manner. For example, the list of playlists may be displayed on the monitor of another device.

One of the displayed playlists is selected by the listener as shown in block 32. The selected playlist is a playlist that is expected to contain one or more songs that the listener would like to listen to. For example, the displayed list of playlists may contain a playlist named rock favorites, a playlist named country favorites, and a playlist named classical favorites. If the listener wants to listen to classical music that is on the playlist named classical favorites, the playlist named classical favorites is selected.

The desired playlist may be selected by using a touchscreen display of the first device 13, may be selected using the keypad 23, or may be selected by any other desired means.

At least one attribute of the selected playlist is sent from the first device to a playlist server as shown in block 33. The attribute(s) may comprise, for example, the name of a playlist, the number of a playlist, and/or any other unique identifier of a playlist.

Alternatively, the attribute(s) may comprise one or more parameters that are indicative of the type of music that the listener would like to hear. For example, the attribute(s) may comprise a code that indicates that a list of the top ten country hits for the week that is to be returned. The user may preferably compile sets of such parameters so as to facilitate the retrieval of custom, up to date playlists from the playlist server. Such parameters may be compiled directly on the first device or on any other device, such as a personal computer.

A playlist that corresponds to the attribute(s) is sent from the playlist server and is received by the first device as shown in block 34. This playlist is a list of songs containing at least one song that the listener would like to hear.

The listener selects at least one song from the received playlist, as shown in block 35. Either a single song may be selected, or a plurality of songs may be selected. The song(s) may be selected by using a touchscreen display of the first device 13, may be selected using the keypad, or may be selected by any other desired means.

Information representative of the selected song(s) is sent to a content server 10. The information may comprise the name(s) of the songs, the number(s) of the songs, or any other unique identifier thereof.

The selected song(s) are communicated from the content server 10 to the first device 13 via the Internet 11 as shown in block 37. The format of the selected songs may be MP3, WAV, or any other desired format.

The selected songs are played by the first device 13 as shown in block 38. The selected songs may be played in the order selected, in random order, or in any other desired order. The order can preferably be changed at any time.

The songs may be played via one or more speakers that are part of the first device 13, by one or more speakers that are in communication with the first device 13 (such as via a wired or wireless connection), by headphones, by earphones, or by any other desired means.

The volume, tone, and balance of the songs is preferably adjustable via the first device 13, such as via the display 22 and/or keypad 23 thereof.

Figure 4:
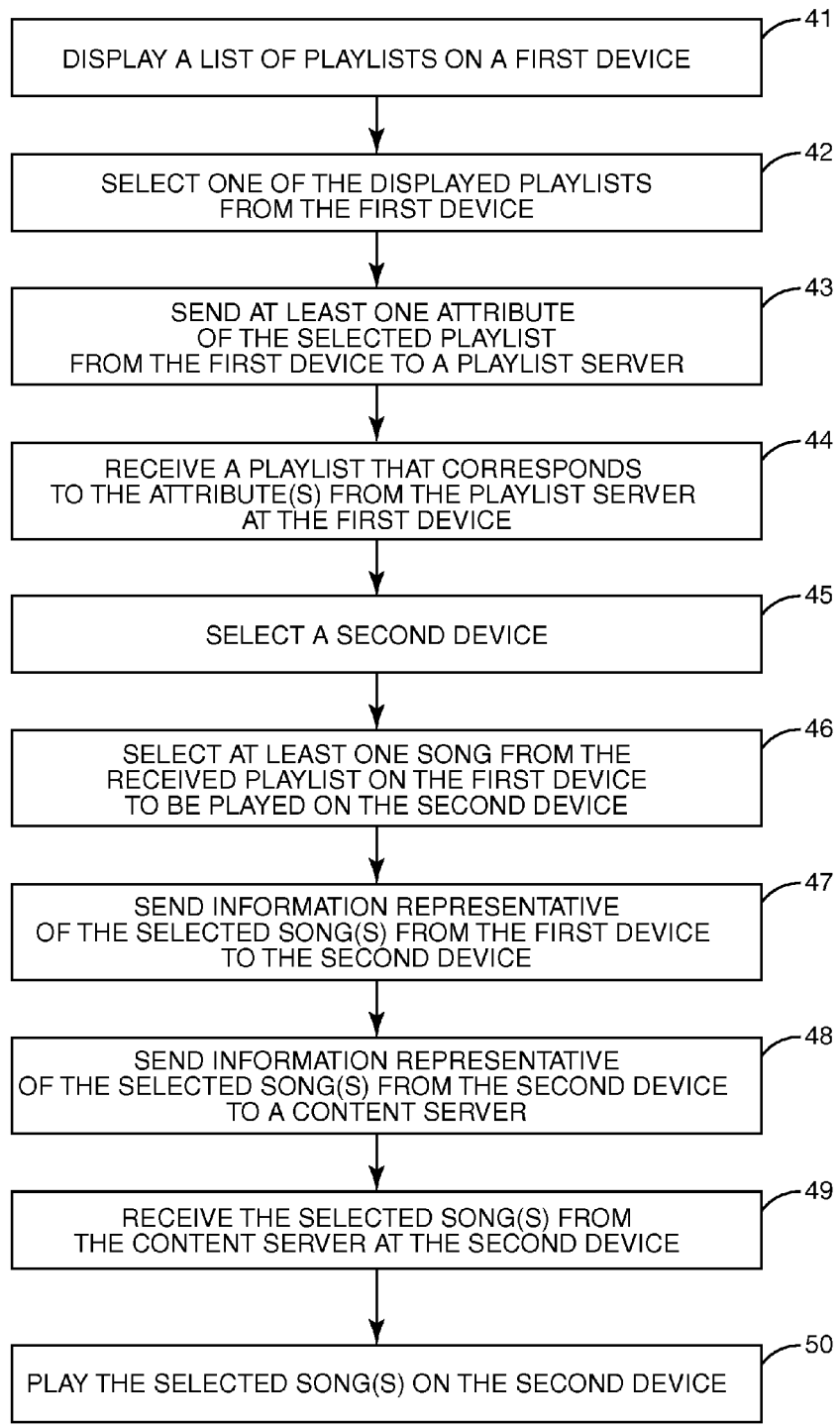
FIG. 4 is a flow chart showing another way of operating a digital entertainment system of the present invention.

Referring now to FIG. 4, the second way of operation of the first device is illustrated. According to this second way of operation, a list of playlists is displayed as shown in block 41, one of the playlists is selected as shown in block 42, at least one attribute is sent to the playlist server as shown in block 43, and a playlist is received as shown in block 44, all in the same fashion as in the first way of operation discussed above.

According to the second way of operation, the song is played on a device other than the first device 13. Thus, a second device 14 typically must be selected as shown in block 45. A particular second device may be selected from a list of second devices that is displayed on the first device 13. For example, a listener's desktop computer may be selected from a list having the desktop computer, a television, and a stereo listed thereon.

Preferably the list of second devices is dynamic and is automatically updated, such as via the use of a device discovery process that is described in detail below. Alternatively, the list of second devices may be pre-configured by the listener and then manually updated, as desired.

According to the device discovery process, when a user enters a place he can search for devices by broadcasting on the network. These devices will return a location ID for the location that they are a part of. The user can then select that location and enter the correct password for that location. Once they do this all the devices in that realm will show up no matter if they are local or remote. The user is then free to do whatever they want with the other devices if the security is setup to allow other users to control the device.

At least one song is selected from the playlist as shown in block 46 and as discussed above.

Information representative of the selected song(s) is sent from the first device 13 to the second device 14. This information tells the second device 14 what song(s) are to be played. However, the second device does not typically have the selected songs stored therein. In some instances the selected songs may be cached within a memory of the second device 14, as discussed above.

The second device 14 sends information representative of the selected song(s) to a content server. Optionally, the second device also sends at least one attribute of the playlist from which the song(s) were selected on the first device 13 to the playlist server, as well.

The selected song(s) are received from the content server by the second device as shown in block 44 and are ready for playing. Optionally, the same playlist that is presently available for display on the first device is received from the playlist server, such that it is also available for display on the second device.

Generally, songs may be selected and played from the second device 14, as well as from the first device 13, such that it is beneficial to display the playlist on the second device 14. Even if songs cannot be selected and displayed from the second device 14, it may still be beneficial to view the playlist thereon.

The selected song is played on the second device 14 as shown in block 50 and discussed above. Parameters of the song such as volume, tone, and balance are optionally controllable from the first device 13.

Optionally, playlist and/or songs are cached in the first device 13 and/or the second device 14. Caching is particularly beneficial when the same songs and/or playlist are used repeatedly.

Although playlists and/or songs may be cached so as to mitigate the need for repeated downloading thereof from the playlist/content server 10, the memory requirements of the first device 13 and second device 14 are substantially reduced.

This is true because the first device 13 and the second device 14 of the present invention do not store a substantial quantity of playlists or songs thereon.

That is, the first device 13 and the second device 14 of the present invention do not have to store all of the songs that a listener wishes to hear thereon. Rather, any such storage is generally incidental. Typically, a large number of the songs played by the first device 13 and the second device 14 are stored on the content server 10 and are communicated via the Internet 11 to the first device 13 and/or the second device 14 as needed.

Of course, such remote storage reduces the need for memory for the first device 13 and the second device 14, thereby desirably reducing the cost and size thereof and also enhancing the reliability thereof.

Figure 5:
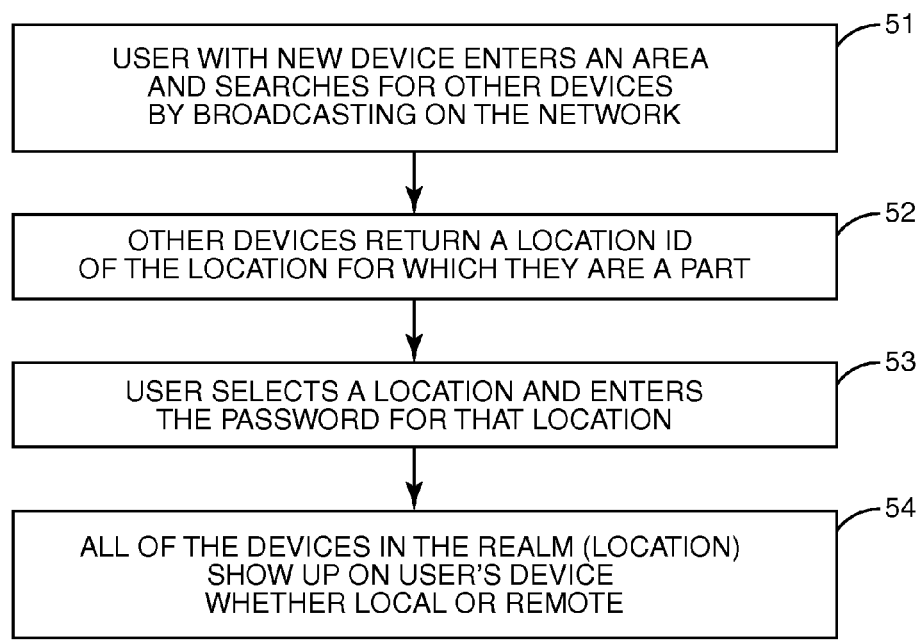
FIG. 5 is a flow chart showing operation of a discovery process wherein devices of the present invention recognize one another.

Referring now to FIG. 5, according to one aspect of the present invention all of the devices within an area, such as the area within which the devices can receive each other's wireless broadcast signals, are aware of one another and communicate with one another. When a new device enters the area, the existing devices become aware of the new device and the new device becomes aware of the existing devices via a discovery process.

According to this discovery process, all devices may periodically broadcast an identification code and a password. The identification code uniquely identifies the device. The password authorizes the device to communicate with other devices within the area.

When a new device enters the area, the new device and the existing devices communicate with one another. This may be done either directly or via a server, as discussed in detail below. The new device recognizes any of the other devices that have an acceptable password and displays a list of the other devices on its list of available devices, so that the other devices may be selected as second devices for playing of songs, as discussed above.

Similarly, the devices already in the area recognize the new device if the new device has an acceptable password, and the devices already in the area display the new device in their list of available devices so that the new device may be selected as a second device for the playing of songs, if desired.

Alternatively, when a user enters a place with a new device, he can search for other devices by broadcasting on the network (whether wired or wireless), as shown in block 51. The other devices will return a location ID for the location or realm of which they are a part, as shown in block 52. The user can then select a desired one of the locations and enter the correct password for that location, as shown in block 53. Once this is done, then all of the devices in that realm will show up regardless of whether they are local or remote, as shown in block 54. The user is then free to do whatever the user wants to do with the other devices, if the security is set up to allow other users to control the other devices. For example, the user may play a song through another device or download a song therefrom.

Figure 8:
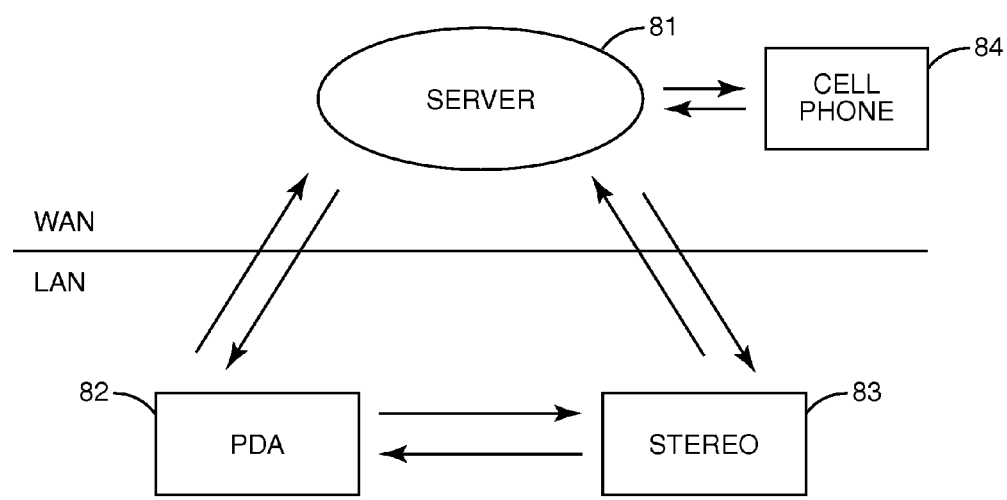
FIG. 8 is a block diagram showing the discovery process for both a local device and a remote device.

Referring now to FIG. 8, the discovery process is described in further detail. Preferably, a device can obtain a list of other devices in one of two different ways. According to a first way of obtaining lists of other devices, the lists are obtained through a server whether the device obtaining the lists is a local device or a remote device. According to a second way of obtaining lists of other devices, the lists are obtained directly from the other devices themselves, as long as the device obtaining the lists and the other devices are all local devices.

A local device is a device that is on the same local area network (LAN) as the other devices. That is, devices are considered to be local with respect to one another if they are all on the same local area network. A remote device is a device that is not on the same local area network as the other devices.

According to the first way of obtaining device lists, server 81, preferably on a wide area network such as the Internet, facilitates communication of a list of devices to a new device. The server may be the same server as the playlist server/content server 10 of FIGS. 1, 6, and 7 or may be a different server.

For example, if PDA 82 is a new device entering the area of a wireless local area network, a user may enter a user name or ID, a location identifier, and a password into the PDA 82. The user name or ID identifies the user to the rest of the local area network. An example of a user name or ID would be Joes PDA.

The location entry identifies the network that the user wants to become part of. For example, a network at Joe's house may be conveniently named Joes House.

The password is typically necessary to be part of the local area network. That is, the local area network will typically not allow a new device to log thereon without the correct password. The use of passwords may optionally be omitted, if desired.

Once the appropriate ID, location, and password have been entered, then the PDA 82 communicates with the server 81, such as via a wireless access point. The server 81 maintains a list of the devices on the local area network and communicates this list to the new device, i.e., the PDA 82.

The PDA 82 may then be used to select and control another device on the local area network, such as stereo 83. That is, the user may select the stereo 83 from the list of devices on the local are network and then may command the stereo to play a song or playlist of songs on the playlist of the PDA 82. The PDA 82 may also be used to control parameters of the song being played on the stereo 83, such as volume, tone, and balance. The PDA 82 may also be used to control the order in which the songs are played.

The PDA 82 may directly control the stereo 83, as indicated by the arrows therebetween. Alternatively, the PDA 82 may control the stereo through the server 81, particularly in those instance wherein communication directly between the PDA 82 and the stereo 83 are not adequately facilitated, such as when the distance therebetween is too great or when an obstruction (such as a wall or a larger piece of furniture) blocks the signal between the PCA 82 and the stereo 83.

When a new device can become part of the local area network, as described above, then the new device is a local device. However, in some instances a remote device may similarly be used to control a device on the network, such as the stereo 83, even though the remote device is not part of the local area network.

For example, the cell phone 84 is a remote device because it is not part of the local area network that the stereo 83 is on. However, the cell phone 84, may still communicate with the server 81, so as to obtain the list of devices on the local area network therefrom. It is still necessary for the cell phone user to enter an ID, location, and password into the cell phone, as was done with the PDA.

The remote device, i.e., cell phone 84, may similarly be used to control the stereo. However, the control signal will be communicated from the cell phone 84 to the server 81 through the server, since direct communication between the cell phone 84 and the stereo is typically not facilitated. Thus, the server 81 functions as a gateway for the remote device to communicate with devices on the local area network.

Preferably, the list of devices communicated from the server 81 to a new device, e.g., PDA, contains an indication as to whether devices on the list are local or remote with respect to the local area network. Thus, the new device knows whether commands to other devices must go through the server 81 or not.

According to the second way of obtaining a list of devices, instead of obtaining the list from the server 81, each device continuously broadcasts its presence, so as to facilitate auto-detection thereof. Thus, each device individually compiles its own list of other devices by monitoring the broadcasts therefrom. Preferably, a user must enter an ID, location, and password, as discussed above.

According to either method for obtaining a list of devices, a particular physical location, such as a coffee shop for example, may contain a plurality of logical locations or realms. Thus, a user may select a particular logical location to log onto. For example, one group of people at the coffee shop may be logged onto a location or local area network named Joes Coffee Group, while another group of people is logged onto a different location or local area network named Bills Coffee Group. A person newly entering the physical location, i.e., the coffee shop, may choose which group to join.

However, the new person must have the correct password for the logical location that he wishes to join. The password may be obtained by requesting it form someone in the logical location. Logging on to the logical location causes a list of devices (or users) to be communicated to the new user's device and also causes the new user's device to be added to the device lists of the other users, as discussed above.

According to one embodiment of the present invention, the first device comprises a remote control for a set-top box and the second device comprises a rendering device that receives signals from the set-top, such as a television or stereo. This embodiment of the present invention is illustrated in FIGS. 6 and 7 and is described in detail below.

Figure 6:
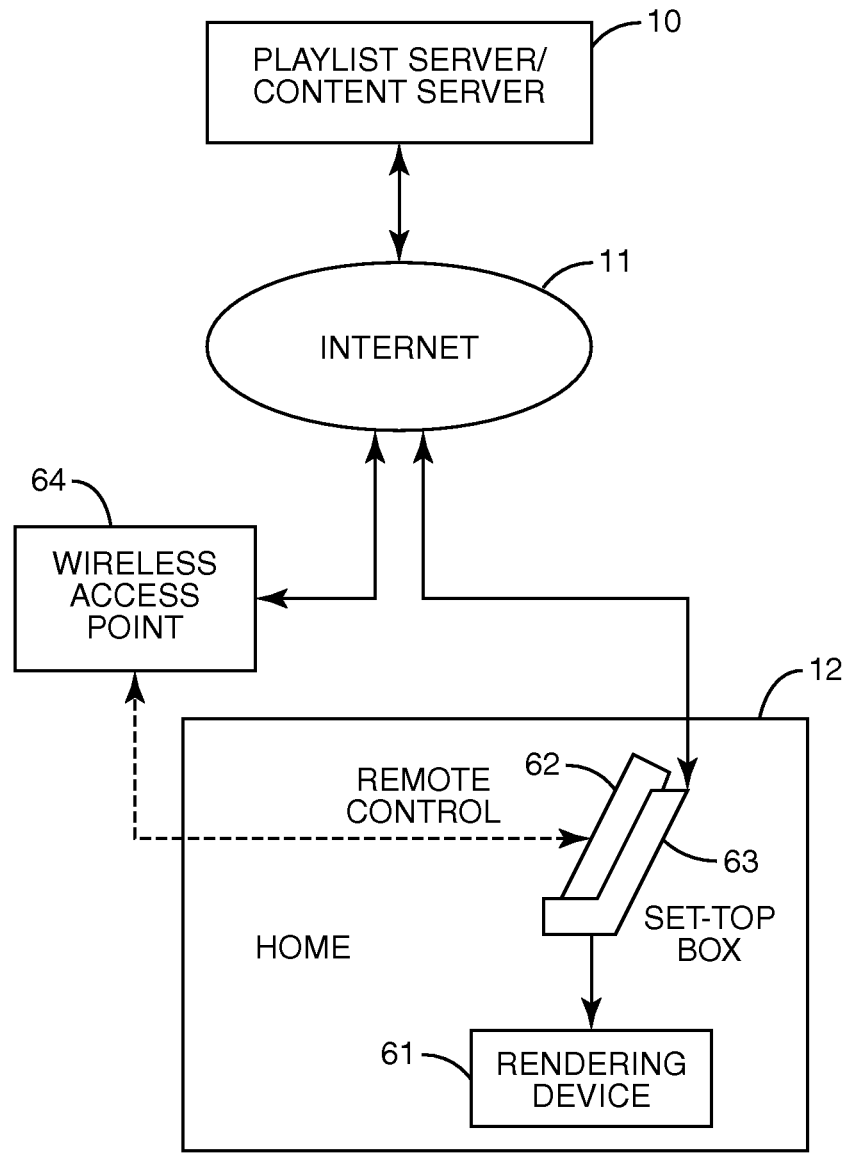
FIG. 6 is a block diagram showing an exemplary embodiment of the digital entertainment network of the present invention, wherein a set-top box has a removable remote control disposed within a cradle thereof.
Figure 7:
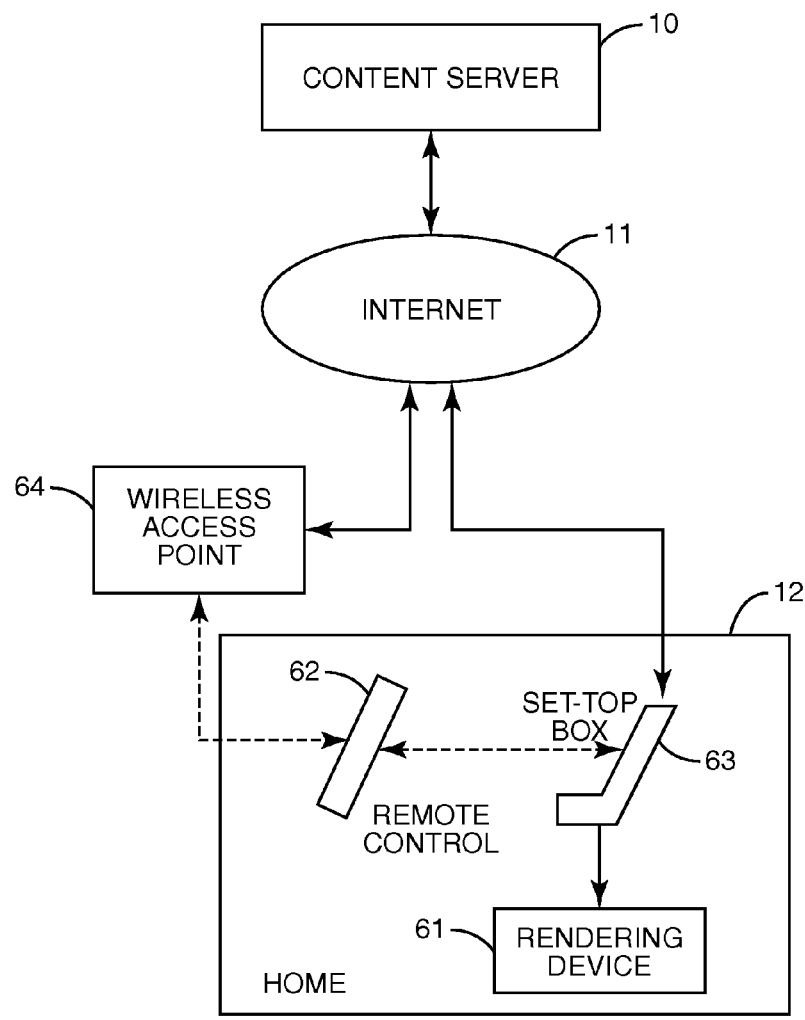
FIG. 7 is a block diagram showing the digital entertainment network of FIG. 6, wherein the set-top box has the removable remote control disposed out of the cradle thereof.

Referring now to FIG. 6, one embodiment of the present invention comprises a set-top box 63 that provides a signal to a rendering device, such as a television or stereo 61. The set-top box is in communication with the Internet 11. A playlist server/content server 10 is also in communication with the Internet, as described above.

Optionally, the set-top box functions as a cable television box in addition to functioning as a portion of the digital entertainment network of the present invention.

A remote control 62 for the set-top box 63 preferably fits into a cradle defined by at least a portion of the set-top box. The remote control 62 communicates wirelessly with the set-top box to control operation of the rendering device 61.

The remote control 62 is in wireless communication with the Internet 11, such as via a wireless access point or wireless router 64.

The remote control 62 defines a first device, as described in detail above. The set-top box, in combination with the rendering device 61, defines a second device as also described in detail above.

Thus, playlists can be requested by the remote control 62 and downloaded from the playlist server 10 via the Internet 11 thereto. Similarly, songs may be downloaded to the remote control 62. The songs may be played on the remote control 62 or may be played on the rendering device 61 in its role as a second device as described above.

For example, a song may be previewed on the remote control 62, even while another song is being played on the rendering device 61. A song may be listened to solely on the remote control 62 as the remote control is carried about at home. Such listening may be via one or more speakers built into the remote control 62 or may be via earphones.

Optionally, the set-top box comprises a display, so that playlists and songs can be selected therefrom. Playlists and songs are downloaded to the set-top box in its role as a second device, as discussed above.

The remote control 62 may be used while cradled by the set-top box 63, as shown in FIG. 6. Alternatively, the remote control 62 may be used while removed from the set-top box 63, as shown in FIG. 7.

Chat is preferably provided by the first 13 and/or second 14 devices of the present invention. Chat may be used for collaboration among listeners, such as for the compilation and/or exchange of playlists. Such chat may be implemented as voice chat or as text chat in a fashion similar to Internet Relay Chat (IRC), Microsoft Instant Messenger (IM), or AOL Instant Messenger (IM).

According to one aspect of the present invention, playlist recommendations may be provided to a listener. These playlist recommendations may be provided by the playlist server and may be based upon the listening habits of the listener or upon previous playlist requests. The listening habits of the listener may be determined from playlist and/or song downloads from the playlist server and/or the content server. That is, a playlist recommendation of a playlist of the top ten contemporary songs may be made by the playlist server to a listener who continually listens to several of the songs on this playlist. Similarly, a playlist recommendation of a playlist of the top ten country songs may be made to a listener who has requested playlists containing country songs.

The playlist server may also provide playlist recommendations based upon the playlists of others. That is, the playlist server may be configured to recognize when two or more people appear to have similar listening habits and may then recommend the playlists of one of these people to others of the same group.

The wireless communications discussed herein may be effected via a network, such as a network conforming to the Bluetooth (a trademark of Bluetooth SIG, Inc.) standard and/or conforming to the WiFi (a trademark of the WiFi Alliance) standard.

Communications between the first and second devices may be either via a network or via dedicated non-network communications devices such as those utilizing any desired form of wireless data transfer, including those using infrared (IR) and radio frequency (RF).

Although the content described herein is music, those skilled in the art will appreciate that other types of content, including both audio and non-audio content, are likewise subject to use by the present invention. For example, the content may comprise talks, speeches, comedy sketches, stories or books that are read aloud, pictures, video, software, or data.

It is understood that the exemplary digital entertainment network described herein and shown in the drawings represents only presently preferred embodiments of the invention. Indeed, various modifications and additions may be made to such embodiments without departing from the spirit and scope of the invention. Thus, various modifications and additions may be obvious to those skilled in the art and may be implemented to adapt the present invention for use in a variety of different applications.

What is claimed is:

1. A method of discovering devices for playing media items, the method comprising:
   providing a plurality of devices on a local area network, each device having a communication interface being operably connected to a server on a wide area network via the local area network;

bringing a new device unknown to the local area network and the plurality of devices into proximity of at least one device on the local area network; and while in the proximity of the local area network, wirelessly receiving, by at least one processor of the new device, via a wireless interface of the new device, via the wide area network, a list identifying the plurality of devices from the server.

2. The method of claim 1, further comprising transmitting a location ID and a password from the new device to the server via the wide area network, wherein the location ID identifies a realm, and the password authenticates the new device to the realm.

3. The method of claim 1, further comprising transmitting a password from the new device to the server via the wide area network, wherein the password is associated with a location.

4. The method of claim 1, wherein each device in the list of devices is associated with a realm.

5. The method of claim 4, further comprising:
receiving, via user input, a selection of a device from the list of devices; and
controlling the selected device from the new device via a communication which traverses a path from the new device over the wide area network through the server to the selected device.

6. The method of claim 5, wherein the controlling the selected device further comprises causing the selected device to render at least a portion of a media item.

7. The method of claim 5, wherein the controlling the selected device further comprises downloading a media item from the selected device to the new device.

8. The method of claim 1, wherein each device in the list of devices is operatively connected to the local area network.

9. The method of claim 1, wherein the new device comprises at least one of a PDA, a palmtop computer, a laptop computer, and a cellular telephone.

10. The method of claim 1, wherein the wide area network comprises the Internet.

11. The method of claim 1, wherein the list of devices further comprises an indication of whether each device in the list of devices is a local device or a remote device.

12. A mobile device for effecting the playing of a media item, comprising:
a display;
a wireless interface operative to communicate over a wide area network;
at least one processor;
memory containing software executable by the at least one processor, whereby when executed, the at least one processor is configured to:
receive information from a server on the wide area network regarding at least one other device via the wireless interface when the mobile device comes within proximity of the at least one other device, the at least one other device being on a local area network which is coupled to the server, wherein the mobile device was unknown to the local area network and the at least one other device, the display operative to convey a representation of the at least one other device;
enable a selector operative to select the representation of the at least one other device; and
control at least one function of the at least one other device via a communication which traverses a path from the mobile device over the wide area network through the server to the at least one other device.

13. The mobile device of claim 12, wherein the wide area network comprises the Internet.

14. The mobile device of claim 12, wherein the at least one processor is further configured to receive, via the wireless interface, a list of device IDs, and the selector is further operative to select one device ID from the list of device IDs.

15. The method of playing media items of claim 1, wherein the new device comprises a cellular telephone and the wide area network comprises a cellular network adapted to provide data communication services to the cellular telephone.

16. The method of claim 15, wherein the cellular telephone is not a member of the local area network.

17. The method of claim 15, wherein the new device comprises a stereo.

18. The mobile device of claim 12, wherein the mobile device comprises a cellular telephone and the wide area network comprises a cellular network adapted to provide data communication services to the cellular telephone.

19. The mobile device of claim 18, wherein the cellular telephone is not a member of the local area network.

20. The mobile device of claim 18, wherein the new device comprises a stereo.

* * * * *